July 29, 1924.

D. WECHSLER 1,503,401

PHOTOGALVANOGRAPH

Filed Aug. 17, 1922  3 Sheets-Sheet 1

WITNESSES
William P. Goebel
Robert J. Hulsizer

INVENTOR
David Wechsler

BY
ATTORNEYS

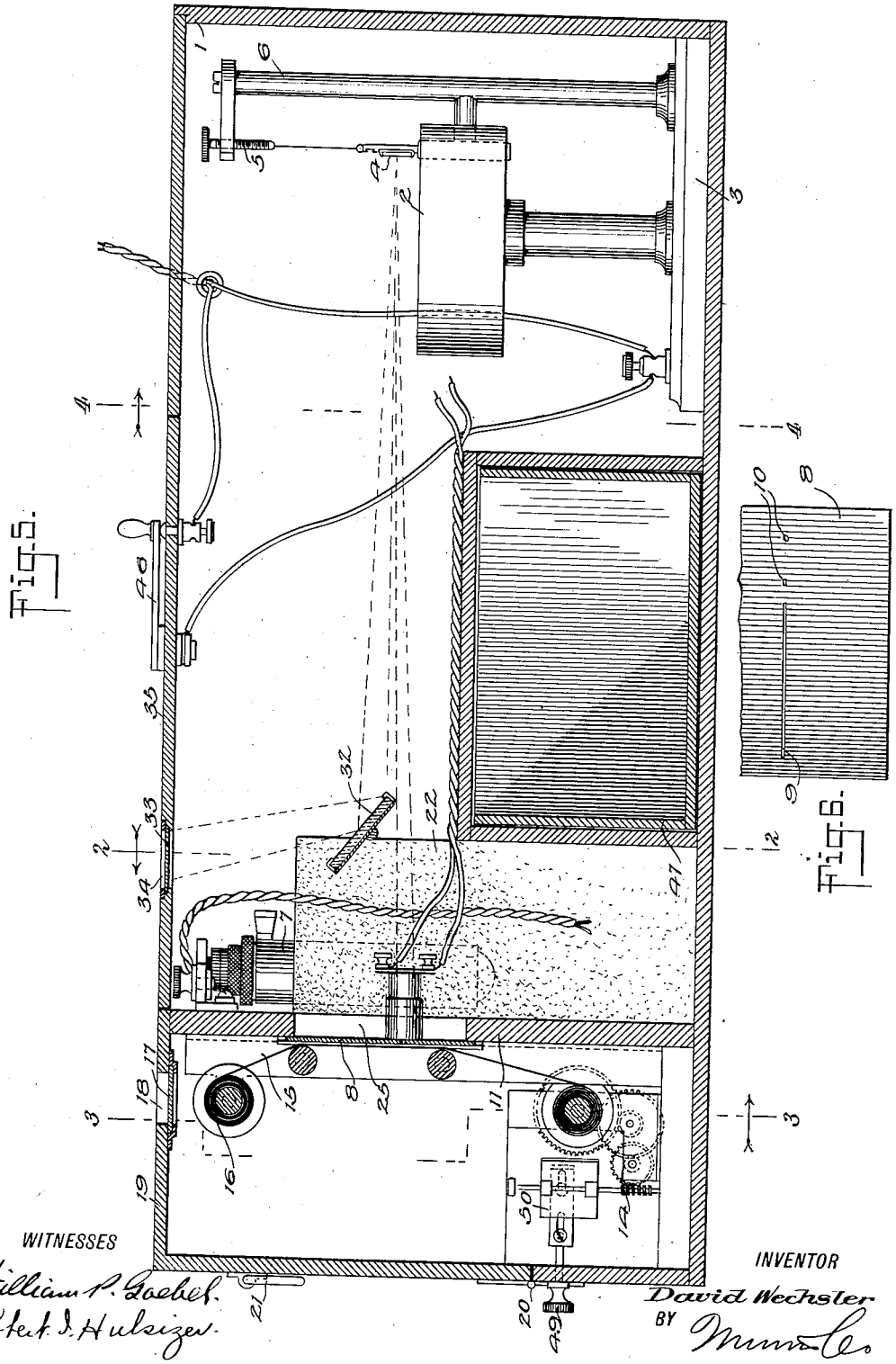

July 29, 1924. 1,503,401
D. WECHSLER
PHOTOGALVANOGRAPH
Filed Aug. 17, 1922 3 Sheets-Sheet 3
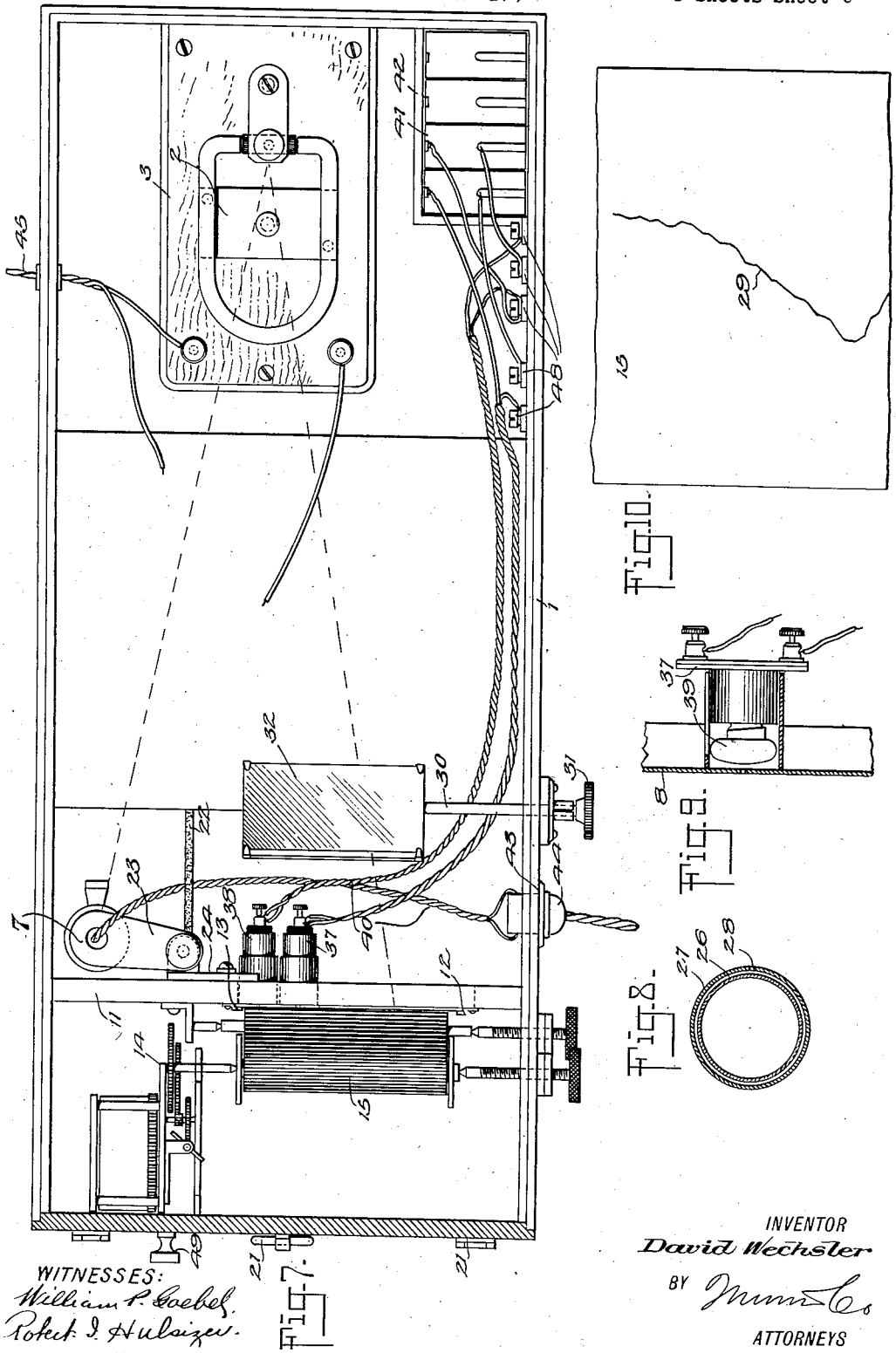
INVENTOR
David Wechsler
BY
ATTORNEYS Patented July 29, 1924.

1,503,401

UNITED STATES PATENT OFFICE.

DAVID WECHSLER, OF NEW YORK, N. Y.

PHOTOGALVANOGRAPH.

Application filed August 17, 1922. Serial No. 582,513.

*To all whom it may concern:*

Be it known that I, DAVID WECHSLER, a citizen of the United States, and a resident of the city of New York, borough of Manhattan, in the county and State of New York, have invented a new and Improved Photogalvanograph, of which the following is a full, clear, and exact description.

This invention relates to a photogalvanograph, and has for an object the provision of a simple, compact, portable device whereby photographic records can automatically be obtained of galvanometric deflections, permitting one to work in broad daylight and, at the same time, to see exactly what is taking place on the recording film used.

Another object is to provide a simple, compact, portable instrument to be used wherever a permanent record of a galvanometric measurement or a continuous graph of a galvanometric deflection is desired, for example, in the measurement of the variation of resistances, the phenomena of polarization, etc., the electrical measurements being facilitated by means of a special electrical testing device which forms part of the apparatus.

A further object resides in the particular construction and arrangement of parts which are hereinafter described and claimed and shown in the accompanying drawings.

The invention is illustrated in the drawings, of which—

Fig. 5 is a section taken on the line 5—5 of Fig. 1.

Fig. 6 is a partial elevation of the screen through which the light is thrown.

Fig. 7 is a plan view of the device with the cover or top plate removed.

Fig. 8 is a horizontal transverse section taken through the main lamp to show the manner in which a flat beam of light is thrown therefrom.

Fig. 9 is a detail section showing the relation between one of the auxiliary lamps and screens.

Fig. 10 is a partial diagram of a record made on the photographic film.

Figure 1:
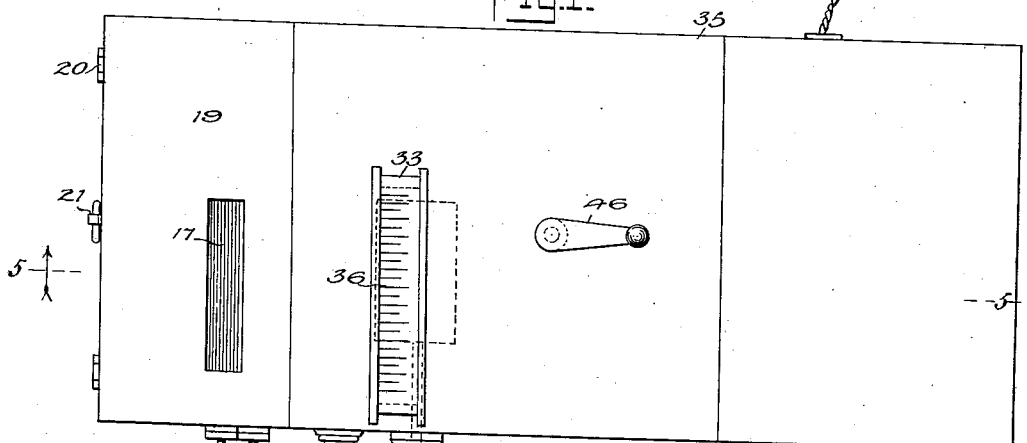
Figure 1 is a plan view of the device.
Figure 2:
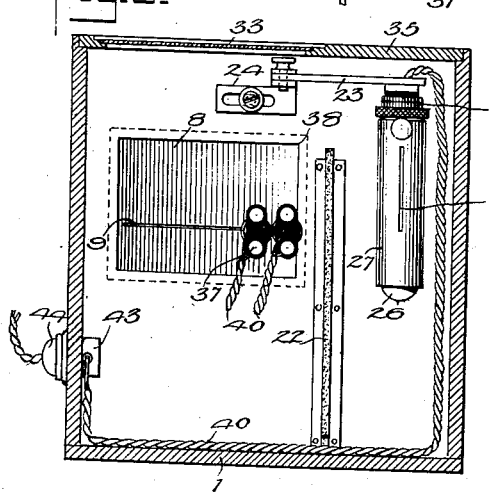
Fig. 2 is a section taken on the line 2—2 of Fig. 5.
Figure 3:
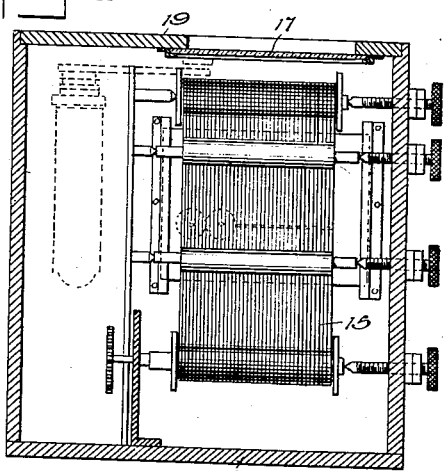
Fig. 3 is a section taken on the line 3—3 of Fig. 5.
Figure 4:
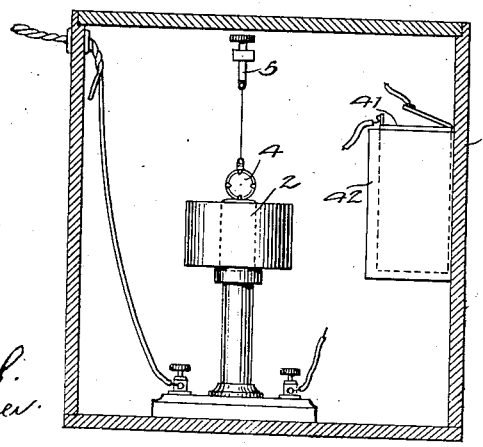
Fig. 4 is a section taken on the line 4—4 of Fig. 5.

The form of the invention shown in the drawings is a preferred form, although it is understood that modifications in the construction and arrangement of the parts and in the character of the materials used may be adopted without departing from the spirit of the invention.

The preferred form of the invention, as shown in the drawings, relates to a device especially adapted for the recording of emotions by making possible the obtaining of an accurate record of the so-called psychogalvanic reflex for the precise and exact measurement of which the instrument was originally and particularly designed. The psychogalvanic reflex consists in the variations in the electrical conductivity of the human or animal skin every time the individual is subjected to an emotion.

The apparatus is also of particular use to the physiologist, neurologist and the physician for studying the phenomena of polarization, conductivity of tissues and resistivity of the blood, and, in conjunction with a thermo-electric couple, for the obtaining of a graphic record of minute variations of temperature imperceptible to and unrecordable with the ordinary thermometer.

The device comprises a box 1 within which, and at one end thereof, a moving coil galvanometer 2 of the D'Arsonval type is mounted on a suitable base 3. This galvanometer has the usual movable mirror 4 supported by an adjusting screw 5 from a pedestal 6. This mirror receives a beam of light from a lamp 7, disposed in another portion of the box at one side thereof, and reflects this beam of light forward upon a screen 8. This screen, as shown in Fig. 6, is provided with a horizontal slit 9 and two small openings 10 adjacent thereto. This screen is placed transversely across a box and at a definite distance from the mirror of the galvanometer. This screen 8 is supported against the rear wall of a partition 11 by means of flanged guiding plates 12 and 13. This partition 11 extends across the entire width of the box from top to bottom and from side to side. Back of this partition is disposed a clockwork mechanism, such as 14, of any suitable type and adapted to move a film 15 past the screen 8. A reel 16, receiving the film which has been exposed adjacent the slit 9, is mounted near the upper end of the box adjacent a translucent red screen 17 disposed across an aperture 18 on the top of the box. This aperture and red screen are formed in a top surface 19 forming part of a movable cover hinged at 20 on one of the end walls of the box, so that this portion of the cover and the end wall can be moved by means of a handle 21 to expose the film 15 and the actuating mechanism therefor.

A partition or screen 22 is disposed adjacent the lamp 7 so that no direct light can be projected from said lamp on to the screen without being reflected into the mirror of the galvanometer.

This lamp 7 is supported from a suitable arm 23 pivoted to a bracket plate 24, this bracket plate being mounted on the front face of the partition 11. This partition 11 has an aperture 25 against which the screen 8 is disposed. The arm 23 is pivoted about the bracket 24 so that the lamp can be moved within certain limits. This lamp comprises an ordinary cylindrical tube 26 surrounded by a metallic opaque shell 27 which, however, is provided with a long vertical slit 28 thereon so that the light projecting from the lamp is a flat vertical beam. The movement of the lamp 7 can be adjusted so that its position will cause the proper projection of the beam upon the mirror 4. This reflection of this beam will strike the slit 9 and cause the film 15 to be affected at a point. Since the film is continuously moving, and since the beam of light is deflected in accordance with the current through the galvanometer, a record such as that designated by the numeral 29 in Fig. 10 is made, which, of course, is calibrated in terms of the particular characteristic being measured, whether it is an emotion or an actual physical change.

On a shaft 30 projecting inward from one side of the box and movable by a thumb nut 31, I support a flat mirror 32. This can be moved to present its reflecting surface partly in the path of the reflecting beam of light so that a portion of this beam will be reflected upwardly against a translucent screen 33 disposed in an aperture 34 in the top of the cover portion 35. In this manner the instantaneous position of the beam of light on the screen 8 can be observed on a translucent screen 33 which may be calibrated or marked, as shown in Fig. 1, with graduations 36 having any definite value. Mounted in any suitable manner adjacent the screen 8 are a pair of lamp units 37 and 38. These units comprise casings containing lamps 39, and these casings are disposed abutting the openings 10 in the screen 8, previously mentioned, so that when the lamps 39 are illuminated a small point of light is projected from the screen 8 on to the film 15. The specific reason for projecting small points of light through the openings 10 in the screen 8 is for the purpose of marking on the film definite points of time in the period of progress of the operation, which will enable the various therapeutic actions to be co-ordinated with the begining and the end of said period of time. The lamps 7, 37 and 38 are suitably connected by circuit wires 40 to any suitable source of power, such as cells 41 mounted in a box 42 disposed within the box 1. The main lamp 7 may, if desired, be connected to a socket 43 into which a usual cord plug 44 may be inserted, this socket 43 being disposed in the side wall of the box. The galvanometer is, of course, connected in circuit with wires 45 and any other suitable apparatus. For instance, in Fig. 5 I have indicated a switching device 46, which may be a Wheatstone bridge or other resistance measuring device, whereby, by methods well known in the art of electrical testing and measuring, minute temperatures can be measured by means of this bridge in combination with the galvanograph and the electrical changes resulting can be recorded on the film 15. In other words, it is my purpose that the device 46 represent any suitable electrical measuring device, such as a Wheatstone bridge or similar device for measuring minute changes of current. I have shown a suitable drawer 47 disposed in the side of the box which can contain any suitable tools or auxiliary apparatus which it is desired to carry around with the operator. The cover portion 35 is removable by merely lifting it from the top of the box, so that the entire interior of the box can be inspected at any time.

The small lamps 37 and 38 and the cells 41 are connected to a plurality of binding posts 48 and these may, in turn, be connected to any suitable switching device (not shown) so that the lamps 37 and 38 can be illuminated or extinguished at any desired time. These lamps and their projected points of light are adapted to be used to indicate the time of any particular action and the period over which said action takes place.

In the operation of the device, it is only necessary to connect the subject to the requisite points in the circuit, to adjust the measuring device 46, if one is used for the measuring to be made, and then start the clockwork by pushing on the button 49 disposed at the rear of the box and connected by a suitable element 50 to the clockwork to start it in motion in any well known manner. The red screen 17 behind the partition and above the film permits the operator to see the film when it is being unwound. An inspection of the screen 33 will also permit him to observe the character of the deflection taking place within the box and being recorded on the screen. At the proper moments throughout the action, he may illuminate the small lamps 37 and 38 and mark on the film the desired points of time throughout the action.

What I claim is:—

1. A photogalvanograph device which includes a film, means for moving said film, a screen disposed adjacent said film and having a slit therein upon which a beam of light is projected, said screen also having a pair of apertures adjacent the slit, and separate means for projecting light through each of said apertures at the will of the operator.

2. A photogalvanograph, which includes a film, a screen past which said film is movable, said screen having a slit therein and a plurality of small apertures adjacent one end of said slit, said apertures adapted to permit the passage of a point of light whereby special characteristics may be marked on the film independently of the slit.

3. A photogalvanograph which includes a box having a partition disposed across the same near one end thereof, a removable cover over the larger portion of said box, a pivoted cover over the smaller portion of said box, a film in said smaller portion, means for moving said film, said partition having an aperture, a screen in said aperture adjacent which the film moves, said screen having a slit therein and a plurality of small apertures, a galvanometer in the larger portion of the box having a movable mirror, a lamp in said box adapted to throw a beam of light on said mirror, the beam of light being reflected from said mirror on the slit in said screen, a partition between the lamp and the screen to prevent light from being projected thereon, a second mirror disposed in the path of the beam of light from the first mirror to the screen, said second mirror adapted when moved to a definite position to reflect a portion of said beam of light, a translucent screen in the top of the main cover portion adapted to receive the image of the beam of light reflected from said second mirror, a second translucent screen in the top of the pivoted cover portion and disposed therein adjacent a portion of the film so that the position and movement of the film can be observable at any instant, a separate independent lamp associated with each of the apertures in the screen, and means whereby at the will of the operator these separate lamps can be illuminated to project a beam of light through the apertures on to the film for the purpose of recording said characteristics thereon.

DAVID WECHSLER.